March 11, 1969

R. H. TWEEDY 3,432,184

POWER ACTUATED TRACTOR HITCH

Filed July 10, 1967

INVENTOR.
ROBERT H. TWEEDY
By Donald G. Dalton

Attorney

United States Patent Office 3,432,184
Patented Mar. 11, 1969

3,432,184
POWER ACTUATED TRACTOR HITCH
Robert H. Tweedy, McCandless Township, Allegheny County, Pa., assignor to United States Steel Corporation, a corporation of Delaware
Filed July 10, 1967, Ser. No. 652,049
U.S. Cl. 280—479
Int. Cl. B60d 1/16, 1/08, 1/10
4 Claims

ABSTRACT OF THE DISCLOSURE

A mechanism for hitching an implement to a tractor. Includes power-driven actuators attached to the tractor and to a coupling plate. Actuators are controlled from within the tractor and can move the plate universally to align it with the implement and engage and release the implement.

Specification

This invention relates to an improved tractor-hitch mechanism.

An object of the invention is to provide an improved hitch mechanism which enables an operator within a tractor to engage or release an implement or other tow quickly and easily.

A further object is to provide a hitch in which the coupling element mounted on the tractor is movable universally to enable it to engage an implement without first accurately aligning the tractor and implement.

A further object is to provide a hitch which may be used to attach an implement to either side or front of a tractor, as well as to the back.

Figure 1:
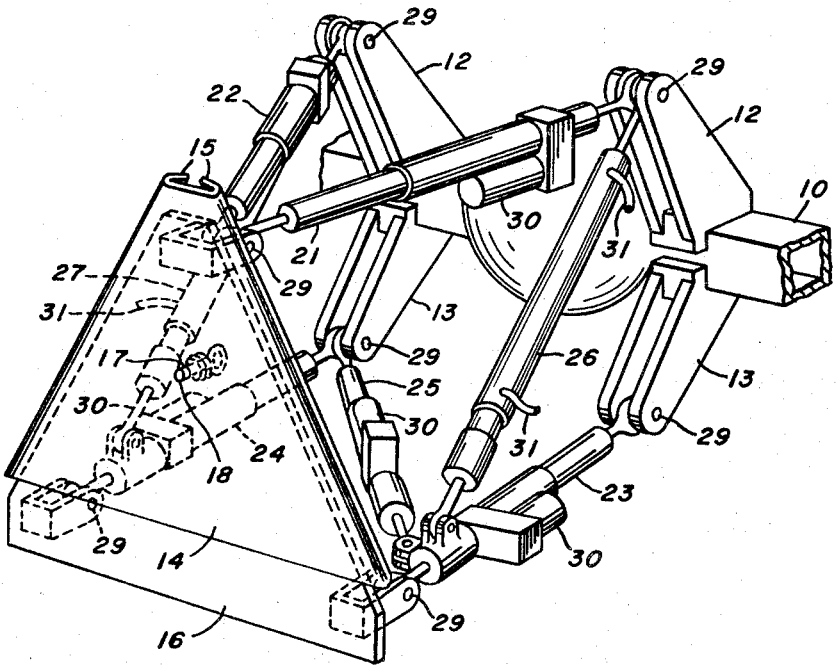
FIGURE 1 is a diagrammatic perspective view of my improved hitch mechanism.

FIGURE 1 shows a portion of a tractor which includes a frame member 10 fixed to the tractor body, and pairs of upwardly projecting arms 12 and downwardly projecting arms 13 fixed to the frame member. The frame member and arms can be situated at the back, front or either side of the tractor. The implement carries a coupling plate 14 which is triangular except that the corners may be cut off. Plate 14 has inturned flanges 15 along the two sloping side edges facing the tractor. The hitch mechanism includes a complementary plate 16 which can be inserted under flanges 15 from beneath. Preferably plate 14 has an opening 17, while plate 16 has a spring-loaded pin 18 to be received in the opening to prevent unintended relative movement between the plates when they are engaged. The tractor and implement can be of any conventional construction apart from the hitch, and hence are not otherwise shown.

The hitch mechanism includes seven elongated power-driven actuators 21, 22, 23, 24, 25, 26 and 27 which lie between the arms 12 and 13 and plate 16. Actuators 21 and 22 extend from the two upwardly projecting arms 12 to the upper vertex of plate 16, converging toward the plate. Actuators 23 and 24 extend from the two downwardly projecting arms 13 to the two lower vertices of plate 16, and are parallel with each other or diverge from arms 13. Actuator 25 extends diagonally from the end of actuator 24 nearer the tractor to the end of actuator 23 nearer plate 16. Actuator 26 extends diagonally downward from the end of actuator 21 nearer the tractor to the end of actuator 23 nearer plate 16. Actuator 27 bears a similar relation to actuators 22 and 24. The joints between the actuators and tractor and plate permit universal movement. The ends of the actuators may have eyelets 28 which loosely receive pins 29 on the tractor, plate or the other actuator to permit such movement, or I may use ball and socket joints. Preferably the five actuators 21, 22, 23, 24 and 25 are driven electrically, and have reversible motors 30 mounted on their exterior. Preferably the two actuators 26 and 27 are driven hydraulically, and have connections 31 which lead to a suitable source of hydraulic fluid under pressure, not shown.

Figure 2:
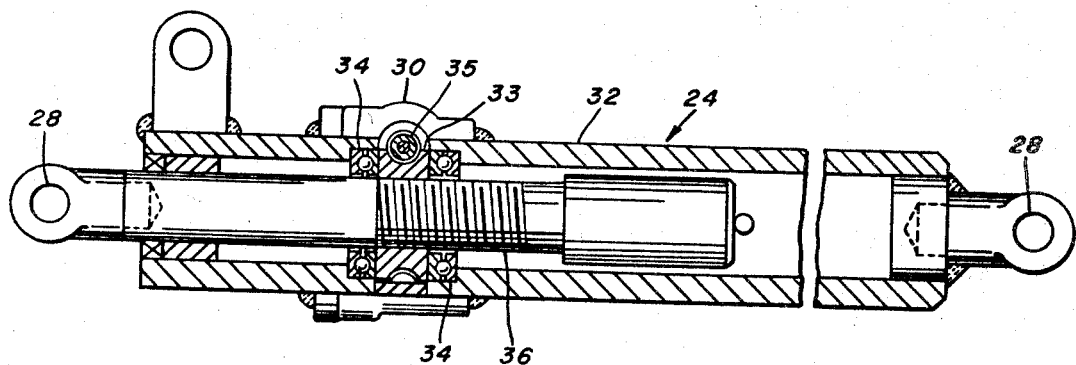
FIGURE 2 is a longitudinal setional view through one of the motor-driven actuators embodied in the mechanism.

FIGURE 2 shows the construction of actuator 24 in more detail. The other electrically-driven actuators are similar; hence the showing is not repeated. The hydraulically-driven actuators are in the form of double-acting hydraulic cylinders, which operate in accordance with well-known principles and are not shown in detail. Actuator 24 includes a tubular body 32 within which a worm gear 33 is journaled on antifriction bearings 34. Motor 30 drives a worm 35 which meshes with the worm gear. A screw-threaded spindle 36 is mounted within the body 32 for relative axial movement. The worm gear 33 has internal screw threads which engage the threads on the spindle, whereby rotation of the worm gear moves the spindle axially to lengthen or shorten the actuator.

In operation, to engage the coupling plates 14 and 16, I first lower plate 16 to a position in which it may be inserted under flanges 15. I accomplish this by lengthening the actuators 26 and 27 to lower the plate, and lengthening or shortening the actuators 23 and 24 to keep the plate 16 essentially parallel with plate 14 when lowered. I move the tractor to a position in which the plates are close but not necessarily precisely aligned and lengthen the four actuators, whereby shortening actuators 26 and 27 will engage plate 16 with plate 14. I reverse these operations to release the coupling plates. The pin 18, if used, can be engaged with the opening 17 by cam action, but must be withdrawn manually. If the tractor and implement are not exactly aligned, I can operate the actuator 25 to move plate 16 sideways, or various combinations of the other actuators to tilt the plate, as required to align the two plates. The actuators 26 and 27 also are used to raise and lower the implement during operation. I can operate all the actuators from a control panel within the tractor, or from a control panel near the mechanism.

I claim:

1. The combination, with a tractor and an implement, of a mechanism hitching said implement to said tractor and comprising a substantially triangular coupling plate carried by said implement and having inturned flanges along two sloping side edges, a complementary coupling plate inserted under said flanges, and a plurality of elongated power-driven actuators between said tractor and said second-named plate and being attached at each end with joints which permit universl movement, said actuators including a converging pair which extend from the tractor to the upper apex of said second-named plate, a parallel or diverging pair which extend from the tractor to the two lower apices of said second-named plate, a diagonal which extends between ends of said parallel pair, and diagonals which extend from the ends of said converging pair nearer the tractor to the ends of said parallel or diverging pair nearer said second-named plate.

2. A combination as defined in claim 1 in which said second-named diagonals are driven hydraulically, and the other actuators are driven electrically.

3. A combination as defined in claim 2 in which each electrically driven actuator includes a tubular body, a worm gear journaled in said body, a reversible motor fixed to the exterior of said body, a worm driven by said motor and meshing with said gear, and a screw-threated spindle mounted within said body for axial movement, said gear having internal threads engaging the threads on said spindle.

4. A combination as defined in claim 1 in which said first-named plate has an opening and said second-named plate has a spring-loaded pin received in said opening.

References Cited
UNITED STATES PATENTS

| | | | |
|---|---|---|---|
| 2,888,995 | 6/1959 | Sorensen | 172—272 |
| 3,029,092 | 4/1962 | Stuart | 280—456 X |
| 3,306,630 | 2/1967 | Weiste | 280—479 |
| 3,285,625 | 11/1966 | Krueger | 280—479 |

LEO FRIAGLIA, *Primary Examiner.*

U.S. Cl. X.R.

172—272; 280—481.